Dec. 14, 1943. J. L. BREESE 2,336,666
PILOT SCREEN FOR POT TYPE BURNERS
Filed July 11, 1941
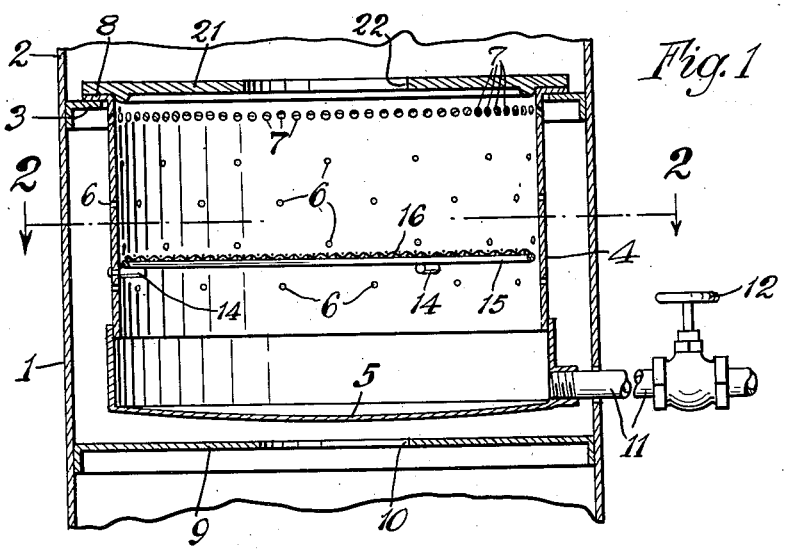
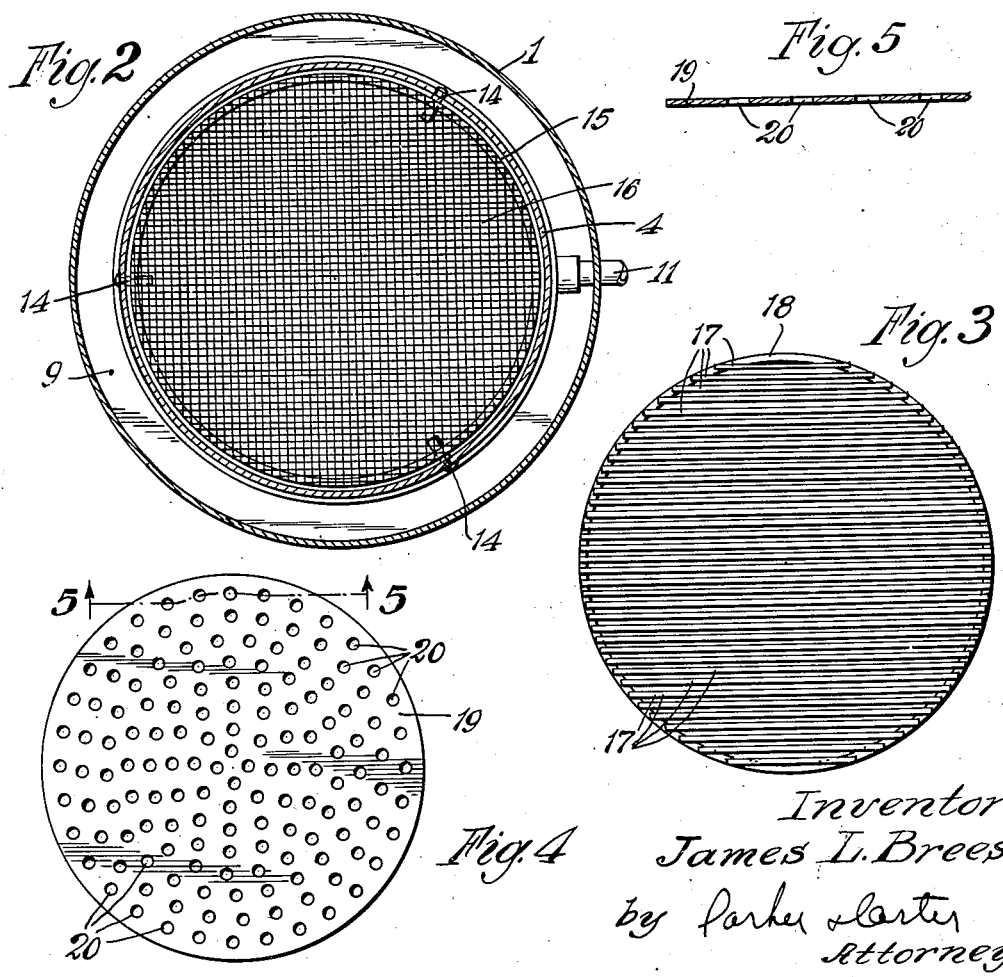
Inventor
James L. Breese
by Parker & Carter
Attorneys Patented Dec. 14, 1943

2,336,666

UNITED STATES PATENT OFFICE 2,336,666

PILOT SCREEN FOR POT TYPE BURNERS

James L. Breese, Santa Fe, N. Mex., assignor to Oil Devices, Santa Fe, N. Mex., a limited partnership of Illinois Application July 11, 1941, Serial No. 401,922

4 Claims. (Cl. 158—91)

My invention relates to an improvement in pilot means applicable but not limited to pot type burners for burning liquid hydrocarbons.

One purpose is the provision of an improved means for permitting a low turndown or pilot stage of liquid hydrocarbon burners.

Another purpose is the provision of an improved partial baffle or screen for use with such burners.

Other purposes will appear from time to time in the course of the specification.

I illustrate my invention more or less diagrammatically in the accompanying drawing wherein:

Fig. 1 is a vertical axial section;

Fig. 2 is a section on the line 2—2 of Fig. 1;

Fig. 3 is a view of a variant form of screen member;

Fig. 4 is a view of a still further variant screen member, on a slightly reduced scale; and Fig. 5 is a section on the line 5—5 of Fig. 4, on an enlarged scale.

Like parts are indicated by like symbols throughout the specification and drawing.

Referring to the drawing, 1 generally indicates any suitable outer drum or base member, which may extend upwardly, as at 2, to provide a combustion or radiating chamber. Mounted upon the angle ring 3 within the base 1 is a pot 4, having a slightly concave bottom member 5. The pot wall is provided with a plurality of primary air inlet apertures 6 located at various levels. Any suitable means may be employed for providing secondary air. I illustrate, however, a plurality of both larger and more closely spaced secondary air inlet apertures 7 located adjacent the top of the pot.

The outer flange 8 of the pot 4 rests upon the angle ring 3. 9 is a bottom member for the base 1, having a central air inlet aperture 10, whereby air is admitted to the space between the member 1 and the pot 4. 11 is any suitable liquid fuel or oil inlet means, controlled for example by a valve generally indicated as 12. It will be understood that any suitable means, automatic or manual, may be employed for controlling the flow of fuel to the pot.

14 is any suitable baffle or screen supporting means, herein shown as a plurality of inwardly extending pins. Referring for example to Fig. 2, I illustrate a baffle member in the form of a ring 15, to which is secured in any suitable manner a body of mesh 16. It will be understood that, if the mesh is stiff enough, the ring may be omitted, but I find it generally preferable to employ the ring. In place of the mesh 16 I may, if desired, employ a plurality of transversely extending rods or wires 17. Preferably the wires are thin and may necessitate the employment of a surrounding ring 18, to which they are welded or otherwise secured. As a further form of baffle member I may employ a preferably flat disc 19 having therein a plurality of air inlet apertures 20, which are herein shown as generally uniformly distributed throughout its area.

21 is any suitable flame ring for the top of the pot, having a central outlet aperture 22.

It will be realized that, whereas I have described and illustrated a practical and operative device, nevertheless many changes may be made in the size, shape, number and disposition of parts without departing from the spirit of my invention. I therefore wish my description and drawing to be taken as in a broad sense illustrative or diagrammatic, rather than as limiting me to my precise showing.

The use and operation of my invention are as follows:

In the employment of pot type burners of the type herein shown, the flame is controlled prevailingly by varying the rate of supply of liquid fuel along the line 11 to the pot. When a maximum supply is delivered to the pot, and assuming that combustion is already under way, the supply of liquid hydrocarbon is sufficient to provide a gaseous fuel vaporized by the heat of combustion in or above the pot to raise the combustion level to or above the flame ring 21. However, it is desirable to provide a low turndown or pilot stage, as burners of this type may be intermittently employed or may be turned down in warmer weather. I find that, if I employ a screen or baffle having a large number of more or less uniformly arranged apertures or spaces, the screen is effective, when the supply of fuel is reduced to the pilot stage, to prevent down drafts of air from above and to permit the maintenance of combustion at a low stage in the bottom of the pot without any disadvantageous deposit of free carbon.

I find it desirable to have the relation of the voids or spaces to the solid part of the screen, roughly, one to three. In other words, if about twenty-five percent of the baffle or screen is open, it serves very well as a means for preventing distributing down drafts or eddy currents, and stabilizes combustion in the lower part of the pot at a low level, without deposit of free carbon.

I claim:

1. In combination, a burner pot having a wall with a plurality of primary air inlet apertures located at various levels therein, means for supplying a liquid fuel to the interior of the pot in controllable volumes, the pot having one or more secondary air inlets adjacent its top, and a screen located intermediate the top and bottom of the pot for limiting downward movement of air in the pot at lower stages of combustion, said screen extending from side to side of the pot and having therein a plurality of generally uniformly distributed apertures.

2. In combination, a burner pot having a wall with a plurality of primary air inlet apertures located at various levels therein, means for supplying a liquid fuel to the interior of the pot in controllable volumes, means for supplying secondary air to the vaporized hydrocarbon, said means being located adjacent the top of the pot, and a screen located intermediate the top and bottom of the pot for limiting downward movement of air in the pot at lower stages of combustion, said screen extending from side to side of the pot and having therein a plurality of generally uniformly distributed apertures, the relative cross sectional area of said apertures being of the order of twenty-five percent of the entire area of the screen.

3. In combination, a burner pot having a wall with a plurality of primary air inlet apertures located at various levels therein, means for supplying a liquid fuel to the interior of the pot in controllable volumes, means for supplying secondary air to the vaporized hydrocarbon, said means being located adjacent the top of the pot, and a screen located intermediate the top and bottom of the pot for limiting downward movement of air in the pot at lower stages of combustion, said screen extending from side to side of the pot and having therein a plurality of generally uniformly distributed apertures, the relative cross sectional area of said apertures being of the order of twenty-five percent of the entire area of the screen, and a reinforcing ring extending circumferentially about said screen.

4. In combination, a burner pot having a wall with a plurality of primary air inlet apertures located at various levels therein, means for supplying a liquid fuel to the interior of the pot in controllable volumes, the pot having one or more secondary air inlets adjacent its top, and a wire mesh screen located intermediate the top and bottom of the pot for limiting downward movement of air in the pot at lower stages of combustion, said screen extending from side to side of the pot and having therein a plurality of generally uniformly distributed apertures.

JAMES L. BREESE.